United States Patent [19]

Wiggins

[11] Patent Number: 4,688,198
[45] Date of Patent: Aug. 18, 1987

[54] ENTROPY GUIDED DECONVOLUTION OF SEISMIC SIGNALS

[75] Inventor: Ralphe Wiggins, Ridgefield, Conn.

[73] Assignee: Schlumberger Technology Corporation, New York, N.Y.

[21] Appl. No.: 684,811

[22] Filed: Dec. 24, 1984

[51] Int. Cl.$^4$ .............................................. G01V 1/37
[52] U.S. Cl. ...................................... 367/46; 367/48; 367/73; 364/421; 364/819
[58] Field of Search ....................... 367/45, 46, 48, 73; 364/421, 724, 728, 819, 825; 381/47, 94

[56] References Cited

U.S. PATENT DOCUMENTS

| | | | |
|---|---|---|---|
| 4,025,721 | 5/1977 | Grauze et al. | 381/47 |
| 4,335,373 | 6/1982 | Sloane | 364/727 |
| 4,458,267 | 7/1984 | Dollozza | 364/414 |

OTHER PUBLICATIONS

Jurkevics et al., "A Comparison of Laurco . . . Methods", 9/15/83, 53rd Annu. SEG Int. Mtg. (Las Vegas), PAP No. S 132.
Ooe et al., "Minimum Entropy Deconvolution . . . ," 6/79, pp. 458–473, Geophys. Prosp., vol. 27, #2, ABST provided.
Wiggins, "Minimum Entropy Deconvolution," 4/78, pp. 21–35, Geoexploration, vol. 16, #1–2.
Jurkevics et al., "A Critique . . . Deconvolution Methods," 12/84, pp. 2109–2116, Geophysics, vol. 49, #12.
Claerbout, J. F., "Parsimanius Deconvolution," 2/80, p. 4, S.E. Asia Petrol. Explor. Soc. Offshore Corp., 2/29/80.
Cabrelli, "Minimum Entropy Deconvolution and Simplicity: A noniterative algorithm," manuscript.
Cabrelli, "Minimum Entropy Deconvolution and Simplicity: A noniterative algorithm," Geophysics, vol. 50, No. 3 (Mar. 1984), pp. 394–413.
Gray, "Variable Norm Deconvolution," Ph.D Thesis, Aug. 1979.
Oldenberg et al., "Wavelet Estimation and DeConvolution," Geophysics, vol. 46, No. 11 (Nov. 1981), pp. 1528–1542.
Ulrych et al., "Analytic Minimum Entropy Deconvolution," Geophysics, vol. 47, No. 9 (Sep. 1982), pp. 1295–1302.
Donoho, "On Minimum Entropy Deconvolution," Applied Time Series Analysis, Department of Statistics, Havard University.

Primary Examiner—Nelson Moskowitz
Attorney, Agent, or Firm—Cooper, Dunham, Griffin & Moran

[57] ABSTRACT

Disclosed are a process and a system for improving seismic returns and other signals representative of nontime varying series which have been degraded by interaction with unknown wavelets. Use is made of a sequence of two-term operators, each derived from the most recent version of the signal and each applied thereto to obtain the next version. The operators are selected such that their application tends to increase the entropy of the signal, and to remove the effects of the unknown wavelets and change the observed signal in a manner which tends to reveal the signal of interest.

35 Claims, 10 Drawing Figures

A. THREE-TERM WAVELET THAT HAS A COMPLEX FACTORIZATION.

B. WIENER INVERSE TO WAVELET A.

C. EGO INVERSE TO B USING A SEQUENCE OF SEVEN REAL TWO-TERM WAVELETS

Fig. 10

ENTROPY GUIDED DECONVOLUTION OF SEISMIC SIGNALS

BACKGROUND AND SUMMARY OF THE INVENTION

The invention relates to seismic exploration for oil, gas and other underground resources and to improving seismic mapping of subsurface formations by the use of a deconvolution technique which gives good results even when the observed seismic signals are not minimum phase or highly non-Gaussian. In a broader sense, one aspect of the invention relates to improving a signal resulting from the physical interaction (convolution) of an unknown wavelet with an unknown stationary random sequence such that the smoothing effect of the wavelet can be removed, or at least substantially removed, and the random sequence can be revealed. In that sense, the wavelet resulting from the explosion which can be used in seismic exploration is an example of an unknown wavelet, the positions of the subsurface seismic reflectors are an example of the members of a stationary random sequence, and the signal to be improved is the seismic trace based on surface measurements of the seismic signal resulting from the interaction (convolution) of the wavelet caused by the explosion and the subsurface reflectors (at the interfaces of subsurface layers having different acoustic properties). Other aspects of the invention are addressed in the detailed description below.

Subsurface reflection seismology involves mapping of subsurface formations on the basis of the arrival times of events reflected from subsurface layers. Seismic energy generated at the surface penetrates the earth's layered media and some of it is reflected back at the interfaces between layers. The reflected energy arriving at the surface is measured by receivers (detectors at the surface. On land, seismic energy typically is generated by chemical explosions, vibrating machines or thumping devices. Preplaced receivers, also called detectors or geophones, arranged in an array or "spread," detect the seismic energy which comes back. At sea, a source such as an array of air guns is actuated every few seconds as the ship moves over a predetermined course. The returning seismic energy is picked up by detectors embedded in a cable (a streamer), trailing the ship.

The complexity of the subsurface structure and the noise and other imperfections of the observed signals make it necessary to process these signals through a number of operations, each involving serious approximations and shortcuts, before a useful map of the subsurface formations can be deduced. One major operation in such signal processing is velocity analysis, made necessary by the fact that the seismic signal observed at the surface shows the reflection events as a function of time, and must be converted into a function of depth in order to derive a more useful map of the subsurface structure. However, seismic waves have a velocity which is very much dependent on the propagation medium, and velocity changes significantly as the waves travel into the earth. Generally, the velocity increases with depth, although occasionally there may be layers in which a decrease in velocity occurs. For a given surface point, the velocity plotted as a function of depth is typically called the velocity function. Thus, there are two important variables: time of reflected events and velocity. From knowledge of these variables, the depth to the reflecting horizons can be determined. Because there are important lateral changes in velocity, and the velocity function varies from one location to another, a given velocity function cannot be assumed to be valid for the entire prospect but must be continuously corrected from place to place over the area of exploration. When a deep enough borehole is available in the right place and can be logged, the velocity function can be estimated from the outputs of seismic detectors placed in the hole at various depths, or by vertical seismic profiling ("VSP"). In most cases, however, it is necessary to estimate the velocity function by measurements confined to the surface, and by subjecting these measurements to sophisticated signal processing. Velocity analysis results are also used in the so-called dynamic corrections outlined immediately below.

Another major operation in processing the observed signals involves corrections applied to the receiver outputs. The so-called static corrections include a source correction and a detector correction, the combined effect of which is to put the seismic signal source and the seismic signal detectors in a fictitious horizontal plane. In practice, this is done by appropriately time shifting the respective receiver outputs. The dynamic corrections convert each receiver output to the output that would have been received if the source and receiver were at the same lateral point, e.g., the point midway between the actual source and receiver locations. In this conversion the traces are considered as made up of primary reflections, i.e., reflections resulting from a raypath from the source down to the reflecting horizon and then directly up to the receiver. If the layers are horizontal, then all the reflection points (or depth points) are directly beneath the midpoint between source and receiver. If the layers are dipping, then the depth points are offset from this midpoint. The dynamic corrections therefore depend on both the velocity function and the dip of the reflecting beds. The component of correction due to the separation of source and receiver is called the normal moveout correction, and the component due to dip is called the dip correction. Thus, four important corrections to the recorded traces (detector outputs) are the source corrections, receiver corrections, normal moveout corrections, and dip corrections.

Each observed signal (recorded trace) can be considered as a time series made up of reflected events together with various interfering waves and noise. The desired reflected events are the primary reflections, that is waves that travel directly down to a given reflector and then directly back up to the surface where they are recorded. An important type of undesired interfering wave is the multiple reflection, which has a raypath that goes down to a given reflector, then up to another reflector, then down to a reflector, then up again, possibly with additional up and down paths, until the multiply reflected event reaches the surface and is recorded. In any layered system there can be infinitely many possible multiple reflections. The presence of such multiple reflections makes the identification of primary reflections difficult. Accordingly, it is necessary to attenuate the multiples as much as possible.

To facilitate the extraction of the useful signal, typically multifold coverage is recorded by laying out a source and a spread of detectors, activating the source and recording the detector outputs, then moving the entire configuration laterally, along the detector line, and repeating the process. When the configuration is moved in small enough increments between shots, each depth point can be covered several times, thereby introducing considerable redundancy which allows subsequent enhancement of the primary events and suppression of multiple events. If all the traces in the prospect are segregated or gathered into sets called gathers such that all traces within a given gather have a common midpoint between source and receiver, the appropriate moveout correction should convert each trace in a given gather into about the same equivalent trace, namely that primary reflection trace which would have been received if source and receiver were directly at the common midpoint in question. Stated differently, the primary reflections of all the traces after appropriate moveout should tend to be in phase while the multiples should tend to differ as between traces and therefore should typically be out of phase. If this approach is used for the normal moveout correction first, then it can also be applied to making the appropriate source, receiver and dip corrections by different gatherings of the traces. Alternately, a simultaneous corrections approach can be used, either directly or through using iterative techniques. If the corrected traces in a common midpoint gather are added up, the result should be severe attenuation of the multiple events, because they should be out of phase with each other, and amplification of the primary events, which should be in phase with each other if the gathers were properly selected and corrected. Thus one output trace for each midpoint can be produced which is called the stacked trace for that midpoint.

A special kind of multiple reflection is the so-called reverberation. One conceptualization of reverberation is energy which gets trapped in the near surface layers and keeps being reflected up and down. This energy can become attached to the primary reflections as they travel through the near surface layers. As a result, instead of being sharp and clear and with good time resolution, the observed reflections are followed by long reverberation trains. These trains overlap with the trains of succeeding reflections, and thus the whole seismic trace (observed signal) can be given a ringing or sinusoidal character which makes it difficult or impossible to pick out the onset of the primary reflections. Cancelling the energy of each reverberation train, but leaving intact the primary reflection, can increase the resolution of all the reflected events. This process of cancelling the reverberation trains typically is called deconvolution, and can be thought of as the inverse of the geophysical process of "convolving" (i.e., rolling together or interacting) the source wavelet with the subsurface formations. However, as will become clearer below, this is not the mathematical process of deconvolution.

One known type of deconvolution is based on considering a wavelet of the observed signal as made up of a primary reflection with its attached reverberation. With this assumption, the wavelet should be minimum delay, in the sense that most of its energy is concentrated in its initial part. Moreover, all such wavelets should be similar in overall shape. Because the primaries result from geologic beds believed laid down with irregular thicknesses, the arrival times of the primary events should be effectively random. Hence, the auto-correlation function of the trace should be about the same as the auto-correlation function of the wavelet, and so from this auto-correlation function one can estimate the required inverse (deconvolution) operator. The application of this operator to the trace should yield the deconvolved trace, namely a trace where the reverberation components of the wavelets have been removed, thereby increasing the resolution of the primary reflections. The process of deconvolution can be extended to remove certain long period multiple reflections as well. In practice, deconvolution can be applied to the seismic traces either before or after stacking, depending upon cost and other considerations.

After deconvolution, the processed signals typically are subjected to a technique called migration or depropagation, which can be conceptualized as a process of propagating the waves observed on the surface backward in time into the earth to the underground structure, to reveal the actual spatial position of the subsurface reflection points at depth. This process can also be described as the transformation of signals observed at the surface to signals which would have been observed at depth.

As discussed in an article by the inventor herein (Wiggins, R. A., Minimum Entropy Deconvolution, Geoexploration, 16 (1978) 21–35), if the source wavelet is known at least approximately, then wavelet shaping by estimating a least squares or Wiener inverse of the source wavelet can lead directly to a good estimate of the desired signal. If the source wavelet is minimum phase or minimum delay, and the desired signal is approximately white, then predictive deconvolution can be used. If the amplitude spectrum of the source wavelet is smooth with respect to that of the desired signal, then homomorphic deconvolution can be utilized. When the desired signal consists of a few large spikes and the ensemble of sample signals exists for which the time separations between the spikes differ while the source wavelet shape remains constant, then minimum entropy deconvolution can be used in the manner described in detail in the article. Further background information can be found in the references cited at pages 34 and 35 in the Wiggins article. Yet further background information can be found in Robinson, E. A., et al., Deconvolution of Geophysical Times Series in the Exploration for Oil and Natural Gas, Elsevier Scientific Publishing Co., 1969 and in Robinson, E. A., Time Series Analysis and Application, Goose Pond Press, 1981. The Wiggins article and said Robinson and Robinson et al. books are hereby incorporated by reference in this specification.

The known "deconvolution" processes applied to seismic traces are believed to have a number of shortcomings. For example, they are not believed to work well with seismic traces which are not minimum phase (delay) or sufficiently non-Gaussian, and different signal processing techniques must be applied depending on which one is the case. Moreover, it is believed that the known processes suffer from complexity and insufficient accuracy.

Accordingly, an important object of this invention is to provide an improved technique of deconvolving the result of the convolution of a wavelet and a non-Gaussian random process, such as the result of the interaction of a seismic source wavelet with the subsurface reflectors, in a manner which works well for all or most typical seismic traces, uses the same approach regardless of the type of trace, processes a trace only as long as needed to deconvolve it sufficiently, and operates rapidly and efficiently. In a broader sense, an important object is to find a practical solution to the so-called blind deconvolution problem, encountered when an observed or measured signal can be considered for practical purposes to be the result of the convolution (interaction) of an unknown wavelet with a stationary random sequence. The goal is to remove the effects of the wavelet to an extent which would allow the underlying random sequence to be revealed and examined free, or substantially free, from the smoothing effects of the wavelet. The invention is particularly useful in solving in a practical manner a long standing problem in seismic exploration, but is also useful in other fields in which the observed signal is not the one of interest, but is the convolution of a wavelet with the sequence of interest, such as, without limitation, in certain sonar and radar activities and in other fields making use of acoustic signals and other signals which get contaminated by an interaction with wavelets which can be treated for practical purposes as convolution.

In conceptual terms, and as applied to seismic exploration, the improved deconvolution technique involves finding what can be characterized as an inverse filter which, when applied to the observed signal, changes it to a good estimate of the reflectivities and locations (in time) of the depth points producing primary reflections giving rise to the observed signal. In practicing one nonlimiting example of the invention, this is done by successively modifying the observed signal by two-term operators. The first operator is chosen on the basis of the observed trace and beliefs as to the entropy of the expected reflectivity series, and is applied to the observed signal to produce a modified observed trace. The second operator is chosen on the basis of the modified observed trace and similar entropy considerations, and is applied to that modified trace to produce a new modified trace. The third operator is chosen on the basis of the last modified observed signal and similar entropy considerations and is applied to the last modified observed signal to produce yet another modified observed signal, and so on until no significant further improvement is apparent. The latest modified observed trace is then a good estimate of the reflectivities and locations (in time) of the subsurface reflectors of interest. Each two-term operator can be of the form $[1,0,0,\ldots,a]$ or $[a,0,0,\ldots,1]$, where the separation between its 1 and a terms is determined from the lag of the maximum deviation of the auto-correlation of the most recently modified (if at all) observed signal, and the amplitude of the term a is found from other characteristics of the most recently modified observed signal (e.g., its auto-correlation). Which of the possible operators is used in a given run through the process is determined on the basis of which gives less entropy of the modified observed signal, and this can be estimated, for example, by using a Varimax measure.

The major steps of a particular nonlimiting example of practicing the invention, as applied to seismic exploration, are as follows:

1. Generate an observed signal. If a stacked trace is used for the observed signal, in the first pass through step 1 the observed signal is the stacked trace itself, and in each subsequent pass through this step 1 the observed signal is the result of most recent pass through step 5 below. The observed signal can be the digitized signal $y(i)$, where $i=1,2,\ldots,I$, and the index i designates digital samples taken over a period long enough to include the deepest reflector of interest (typically several seconds) and the sampling frequency is sufficiently high to satisfy the Nyquist criteria for the highest observed signal frequency of interest. While for simplicity only the example of using the stacked trace as the observed signal will be discussed in detail, this need not be the case. The observed signal can be, as nonlimiting examples, the output of one receiver, some combination of receiver outputs other than the stacked trace, and it can be an observed signal in surface reflection seismics or the observed signal in other types of seismic exploration, such as vertical seismic profiling (VSP), or it can be some other measured signal, such as a sonar or a radar signal;

2. Find the auto-correlation function $R(y,y;i)$ of the observed signal $y(i)$ for $i=0,1,2,\ldots,I$;

3. From the auto-correlation R found in step 2, find the lag d of a selected side lobe of the auto-correlation (e.g., the distance, expressed in the number of steps i, between the central lobe of the auto-correlation, at $R(y,y;0)$ and a selected side lobe, at $R(y,y;i)$. This lag d determines the number of zeroes between the two terms of the operator (if $d=i$, then there are $(d-1)$ zeroes);

4. From the same auto-correlation $R(yy)$ found in step 2, find the amplitude of the term a. One example of a relationship useful for finding the amplitude of the term a is $a=[-R(yy;d)]/[R(yy;0)]$. $R(yy;d)$ is the amplitude of the auto-correlation function of the current observed trace at the selected side lobe and $R(yy;0)$ is the auto-correlation amplitude at the central lobe. Other relationships between auto-correlation attributes can be used instead, so long as the resulting term a, when used to operate on the current observed signal as the first or last term of a two-term operator, minimizes (or at least significantly reduces) the entropy of the result as determined, for example, by checking if a Varimax measure V is maximized (e.g., by checking if the new V is greater than the previous one plus a threshold, and continuing the process only if the answer is affirmative). Having determined the separation d (and, hence, the number of zeroes between 1 and a), and the amplitude of a, one of two possible two-term operators $[1,0,0,\ldots,a]$ and $[a,0,0,\ldots,1]$ is selected on the basis of which is more effective in reducing the entropy of the observed signal resulting from its application to the current version of the observed signal. This can be done, for example, on the basis of a Varimax measure V such as $V=y(i)^4/[y(i)^2]^2$, where $y(i)$ is the modified observed signal resulting from the application of the two-term operator being tested to the current version of the observed signal. The two-term operator giving the larger V is selected, as it is the one determined to be more effective in reducing the entropy of the observed signal; and 5. Apply the two-term operator chosen in steps 3 and 4 to the observed signal to generate a modified observed signal. In the first pass through this step 5 the two-term operator is applied to the actual observed signal, e.g. a stacked trace; in each subsequent pass through this step 5 the newly selected two-term operator is applied to the previous result of this step 5.

BRIEF DESCRIPTION OF THE DRAWINGS

FIG. 4 illustrates: (a1) a plot of the modified observed signal formed by convolving the modified observed signal of FIG. 2 having the larger Varimax measure (shown at (a1) in FIG. 3) with the operator derived from the auto-correlation function shown at (b) in FIG. 3 when used in the form [1,0, . . . ,0,a]; (a2) a plot of the signal formed by convolving the same signals as in (a1) but with the operator having the form [a,0, . . . ,0,1]; (b) a plot of the auto-correlation of the signals illustrated at (a1) and (a2) in FIG. 4; (c1) a plot of the accumulated operator formed by convolving the operator of FIG. 3 which gives the large Varimax measure (shown at (c1) in FIG. 3) with the operator which is derived from the auto-correlation function illustrated at (b) in FIG. 3 and has the form [1,0, . . . ,0,a]; and, (c2) a plot of the accumulated operator which corresponds to that in (c1) but has the form [a,0, . . . ,0,1].

DETAILED DESCRIPTION

Figure 1:
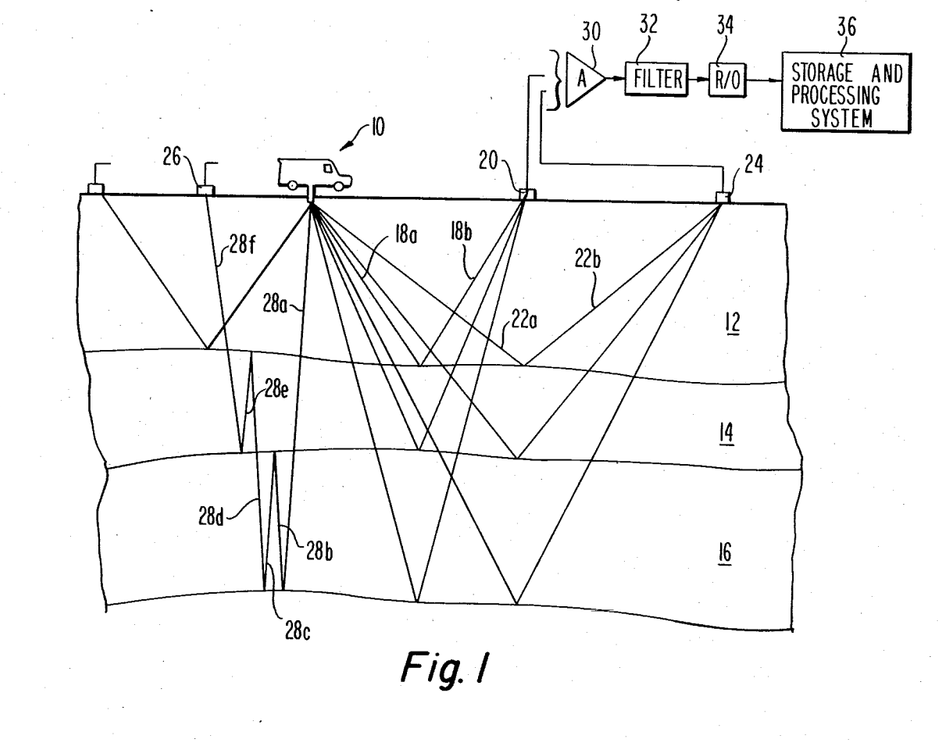
FIG. 1 illustrates in schematic form certain relevant aspects of a system for reflection seismic exploration on land.

FIG. 1 illustrates a typical arrangement for reflection seismic exploration on land making use of an exemplary embodiment of the invention. A source of seismic energy 10 is on the earth's surface, and can be a truck using a vibrator for imparting mechanical vibrations to the earth, or can be any other suitable source of seismic energy. A wave of seismic energy travels downwardly into the subsurface formations 12, 14 and 16. Several raypaths of this wave are illustrated: raypath 18a propagates downwardly to the interface between layers 12 and 14 and returns back to the surface as reflected raypath 18b (a primary reflection) and is received at surface geophone 20; and raypath 22a propagates downwardly to the same reflector and then goes up to detector or receiver 24 as reflected raypath 22b (another primary reflection). Similar raypaths are illustrated as going down to the reflectors between layers 14 and 16 and at the bottom of layer 16 and going up to receivers 20 and 24 as primary reflections. In addition, a multiple reflection received at a detector 26 is shown: raypath 28a goes down to the reflector at the bottom of layer 16, up as ray 28b, down as ray 28c, up again as ray 28d, down again as ray 28e, and up again as ray 28f. For simplicity, the refractions of the raypaths as they go from one layer into another are not illustrated. The outputs of the geophones can be amplified at one or more amplifiers schematically shown at 30, and can be filtered at one or more filters schematically shown at 32 and digitized at 34 before before being sent to a storage and processing system schematically shown at 36. After a suitable number of seismic energy impulses have been imparted to the earth at a particular location and recorded by suitable receivers, the energy source 10 is moved to a new location. The receivers can also be moved to respective new locations, and the process can be repeated to get multifold coverage of the subsurface formations of interest.

Figure 2:
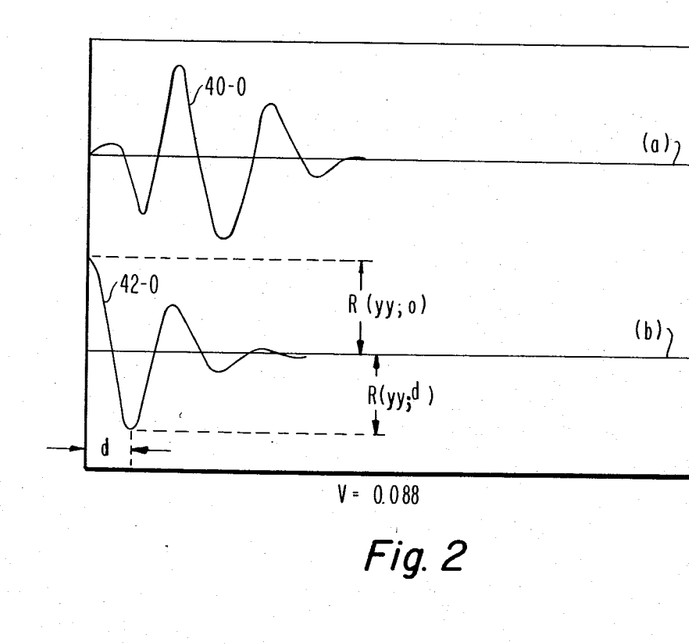
FIG. 2 illustrates: (a) a plot of an observed signal which is a mixed phase wavelet, and (b) a plot of the auto-correlation of the observed signal.

Assuming for simplicity that the outputs of the receivers have been processed through known techniques through the stacking step, assume that a stacked trace can be plotted as a time sequence which includes a wavelet having the shape illustrated at 40-0 in FIG. 2, where the vertical axis is amplitude and the horizontal axis is time increasing to the right. Due to a variety of interfering factors and noise, including reverberation of the seismic energy in the topmost few layers, the stacked trace by itself is not an adequate time map of the reflecting events or of the reflectivities and locations in time of the subsurface reflectors. Assume that in this case the stacked trace 40-0 (the observed signal or, more accurately in this case, the illustrated portion thereof) is a mixed phase wavelet rather than a minimum phase (delay) wavelet and is not so highly non-Gaussian that minimum entropy deconvolution would work well. In accordance with one exemplary embodiment of the invention, an observed signal such as stacked trace 40-0 is modified by applying to it a succession of operators, each succeeding operator being applied to the observed signal as cumulatively modified by the application of each preceding operator, where each operator is selected on the basis of the extent to which its application reduces entropy, and this modifying is continued for as long as sufficient reduction in entropy is achieved, so that the resulting cumulatively modified observed signal can be used as a good estimate of the amplitudes and locations in time of the relevant subsurface reflectivities. To this end, in order to derive the zero-order operator, observed signal 40-0 at line (a) of FIG. 2 is auto-correlated to derive curve 42-0 at line (b), which illustrates only the right-hand side of the auto-correlation results. The term a of the two-term operator of interest is derived from curve 42-0 in the manner briefly described above and described in greater detail below.

Figure 3:
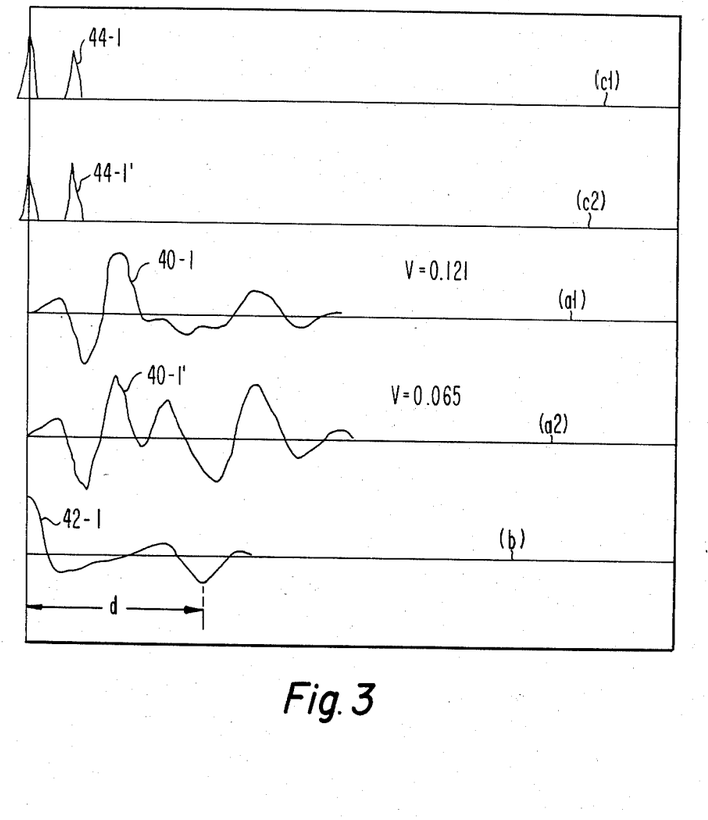
FIG. 3 illustrates: (a) (a1) a plot of a modified observed signal formed by convolving the observed signal of FIG. 2 with the operator (c1) of FIG. 3, having the form $[1,0,0,\ldots,a]$; (a2) a plot of the same observed signal of FIG. 2 convolved with the operator (c2) of FIG. 3, having the form of [a,0,0, . . . ,1]; (b) a plot of the right half of the auto-correlation of the modified observed signals in FIG. 3 ((a1) or (a2), which have the same auto-correlation); (c1) a plot of the operator which is derived from the auto-correlation function illustrated at (b) in FIG. 2 and has the form [1,0, . . . ,0,a]; and (c2) a plot of the operator which is also derived from the function illustrated at (b) in FIG. 2 but has the form [a,0, . . . ,0,1].

In FIG. 3: curve 40-1 at line (a1) is the observed signal 40-0 as modified by applying thereto the two-term operator [1,0, . . . ,0,a] illustrated at 44-1 at line (c1) in FIG. 3; and curve 40-1' at line (a2) is the modified observed signal obtained in the same manner except that the two-term operator is of the form [a,0, . . . ,0,1] illustrated at 44-1 at line (c2) in FIG. 3. Curve 42-1 at line (b) in FIG. 3 is the auto-correlation (the right-hand half only) of curves 40-1 and 40-1', which have identical auto-correlations. As illustrated in FIG. 3, the Varimax measure V for the modified observed signal at 40-1 is larger than that for the modified observed signal at 40-1', and hence the operator having the form [1,0,0, . . . ,a], which was used to modify observed signal 40-0 to produce observed signal 40-1, is chosen for further use.

Figure 4:
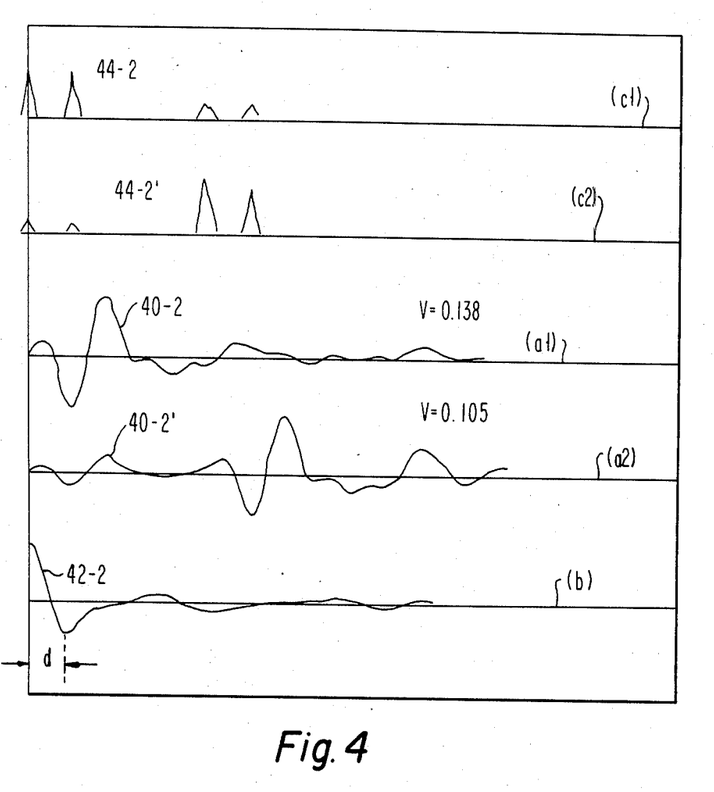

In FIG. 4, curve 40-2 at line (a1) illustrates the result of convolving the curve of FIG. 3 having the larger Varimax measure (curve 40-1 at line (a1) of FIG. 3) with the two-term operator derived from the auto-correlation function 42-1 at line (b) in FIG. 3 when used in the form [1,0, . . . ,0,a]. Curve 40-2' at line (a2) in FIG. 4 is the modified observed signal resulting from convolving the same curve of FIG. 3 with the larger Varimax measure (curve 40-1) with the same two-term operator derived from curve 42-1 in FIG. 3 but having the form [a,0, . . . ,0,1].

In FIG. 4, 44-2 at line (c1) illustrates the accumulated operator formed by convolving (i) the two-term operator 44-1 shown in FIG. 3 (which leads to the larger Varimax curve 40-1 at line (a1) in FIG. 3) with (ii) the two-term operator which is derived from curve 42-1 in FIG. 3 and has the form [1,0, . . . ,0,a]. Curve 44-2' at line (c2) in FIG. 4 illustrates the similarly accumulated operator formed in the same manner as 44-2 but using the two-term operator which is derived from curve 42-1 and has the form [a,0, . . . ,0,1].

Figure 5:
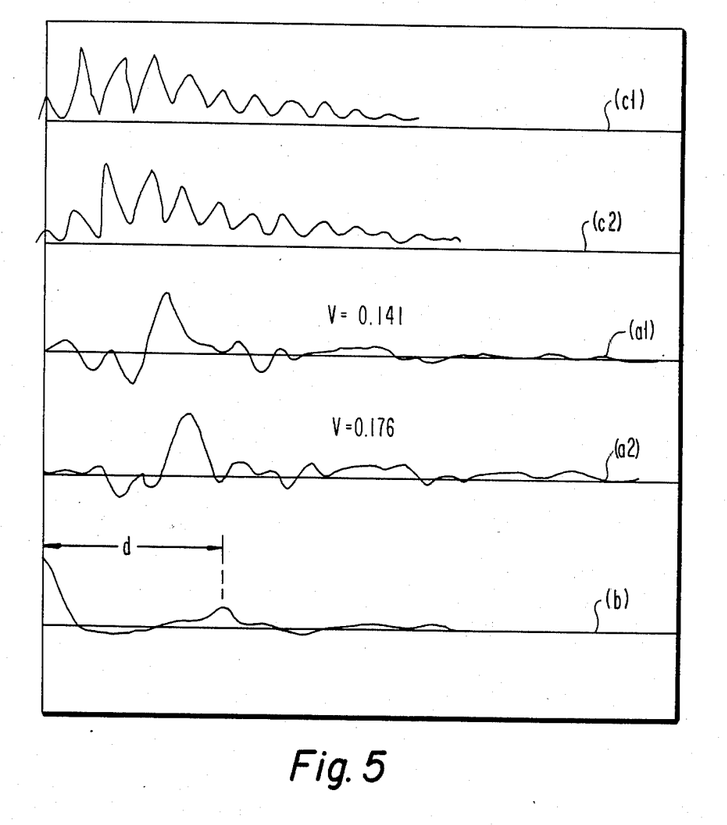
FIG. 5 illustrates the same types of curves as FIG. 4, but derived at a later stage of the process, after seven iterations.

In FIG. 5 the illustrated curves, spikes and Varimax measures illustrate a later stage (iteration) in the process described in more detail below, and have the same relationship to those of the preceding stage (iteration) as that between FIGS. 4 and 3.

It is seen from FIGS. 2–5 that the modified observed signal having the larger Varimax measure (lower entropy) in the respective figures tends to show more detail as additional two-term operators are applied, and that the relevant accumulated operator 44 becomes more complicated. As seen in FIG. 5, the result after seven iterations (passes through the process) is a cumulatively modified observed signal 40-7' having significantly more detail than the original observed signal 40-0 in FIG. 2, and has a significantly larger Varimax measure, and hence lower entropy. The process can continue through additional iterations, for as long as the Varimax measure of new modified observed signal shows a significant enough improvement, e.g., if the new Varimax measure is larger than the previous one by at least a selected threshold.

Figure 6:
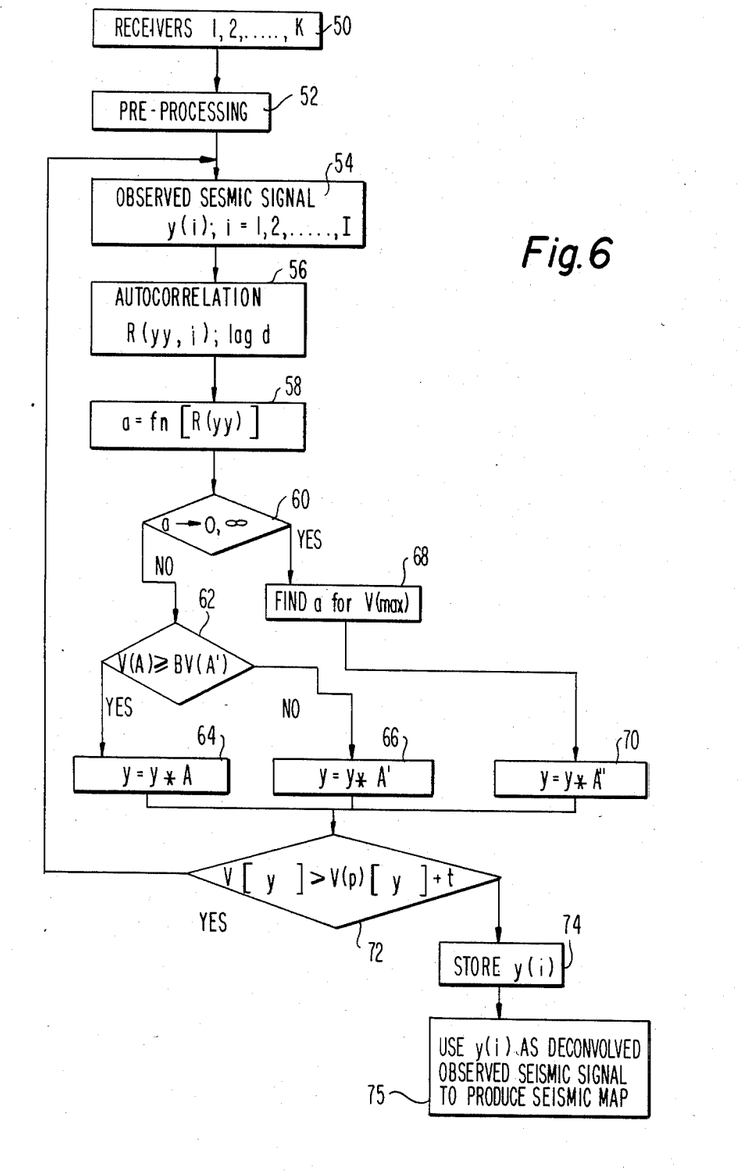
FIG. 6 illustrates a flow chart of the major steps involved in processing observed signals to deconvolve them and produce a seismic map.

The major steps of a non-limiting example of a process embodying the invention, as applied in seismic exploration, are illustrated in FIG. 6, and start at step 50 with collecting the outputs of seismic receivers 1,2 . . . ,K, and supplying them to step 52 where they can be subjected, if desired, to conventional preprocessing, e.g. through the stacking step. At step 54 one stacked trace is used as the observed seismic signal y(i), where i=1,2, . . . ,I, and the samples y(i) of the digitized signal cover a period sufficiently long (several seconds) to allow for the return of primary reflections from the deepest reflector of interest. The sampling frequency is high enough to take into account for the highest frequency of interest in the analog version of observed seismic signal. At step 56 the now digitized observed seismic signal y(i) is subjected to auto-correlation, using any of the suitable auto-correlation techniques known in the art, to produce the auto-correlation signal R(yy;i), which is also in digitized form and comprises samples identified by the index i. The lag d of the maximum deviation of this auto-correlation function is then found in terms of the number of samples i separating the center lobe from the closest lobe to the right, (e.g., the first positive or negative peak to the right), again using known techniques. FIG. 2 illustrates this lag d for the auto-correlation function 42-0, and is the distance, in this example, from the origin to the largest positive or negative peak. Generally, it is preferred, but not essential, to use the distance to the largest (in absolute value) peak, whether positive or negative. However, it is possible to use, at least for some iterations, the distance to the first positive peak, or that to the first negative peak. At step 60 a check is made to determine if the term a approaches zero or infinity, as this can happen if the source wavelet is not a delta function but its auto-correlation is a delta function. If the test at step 60 determines that the non-zero and non-unity term a of the two-term operator does not approach zero or infinity, the process goes to step 62, to find if the Varimax measure V(A), derived on the basis of an operator in which a is the last term, is greater than or equal to a selected multiplier B times the Varimax measure V(A'), derived on the basis of an operator in which a is the first term. The multiplier B can be, for example, 1.05. One convenient Varimax measure V is $V=[y(i)]^4/[y(i)^2]^4$, where y(i) is the observed signal as cumulatively modified by the current and all preceding operators. In case of an affirmative result from step 62, the two-term operator A is used to convolve the current version of the observed signal to derive the new observed signal at step 64, using known convolution techniques. In case of a negative result at step 62, the two-term operator A' (in which a is the last term) is used for the same purpose at step 66. In case the test at step 60 indicates that the term a approaches zero or infinity, the process goes to step 68 to find a term a which, when used as the non-zero and non-unity term of the two-term operator discussed above, maximizes (or at least significantly increases) a Varimax measure such as V, i.e. minimizes (or at least significantly reduces) the entropy of the modified observed signal derived through the use of such an operator, or causes the result to depart maximally from a Gaussian distribution. The result of step 68 is used in step 70 as a part of the two-term operator A'' which is convolved with the current observed signal to derive the new observed signal. The new observed signal derived in step 64, 66 or 70 as described above is tested at step 72 to see if its entropy has been reduced sufficiently. For example, a test is made to determine if a Varimax measure such as V of the new observed signal is greater than that of the immediately previous version of the observed signal plus a threshold t. In case of a positive result, indicating sufficient improvement, the process returns to step 54, and this time the observed seismic signal used there is the version thereof derived in the appropriate one of steps 64, 66 and 70. If step 72 indicates that no significant improvement in reducing entropy has been achieved by the most recently derived two-term operator, the current observed signal is stored at step 74. This signal can be used at step 76 as a deconvolved observed seismic signal. One exemplary use is in producing a seismic map of the subsurface formations of interest through the use of the known techniques discussed above. Such a seismic map benefits from improved deconvolution results achieved through the use of the invention process described above. The resulting seismic map can be displayed on a screen, or printed on paper by a plotter, or otherwise stored and/or made available for use in the exploration and/or exploitation of underground resources.

Figure 8:
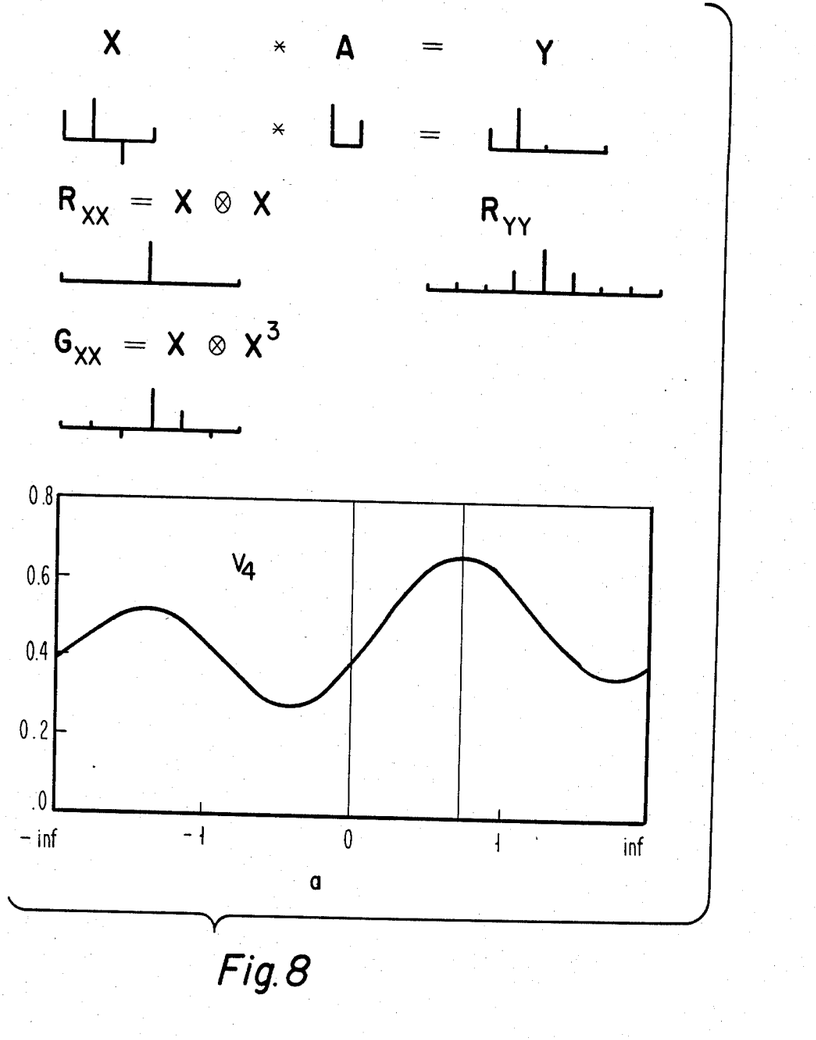
FIG. 8 illustrates the identification and treatment of a nearly all-pass wavelet.

The identification and treatment in accordance with the invention of a nearly all-pass wavelet present in the observed signal, is illustrated in FIG. 8. Wavelet X is a nearly all-pass wavelet, in that its auto-correlation R is nearly a spike. As known in the art, the presence of such a wavelet in the observed signal has little or no effect on the amplitude of the observed signal but can cause a significant phase shift. One practical way discovered as a part of the invention to confirm that an observed signal contains no all-pass wavelet, is to examine the correlation of the wavelet (or the observed signal) with its cubed function. This correlation is designated G(xx) in FIG. 8. If no all-pass wavelet is present, the correlation G(xx) should be as spike-like as the auto-correlation. This is not the case in the example of FIG. 8. The correlation G(xx) is not as spike-like as the auto-correlation of X, and this reveals the presence of the nearly all-pass wavelet X. This test detects the presence of an all-pass wavelet even in considerably more complex functions resulting from the convolution of an all-pass wavelet with another wave which is not all-pass.

Figure 9:
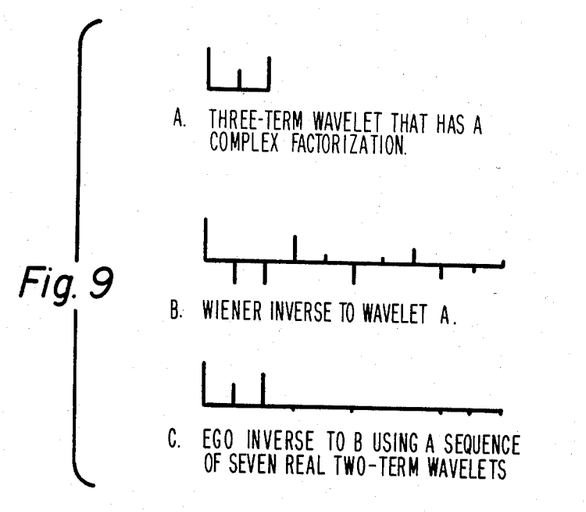
FIG. 9 illustrates the treatment of a wavelet which has a complex factorization.

FIG. 9 illustrates the effectiveness of the invented technique even with observed signals containing a wavelet which has a complex factorization. The 3-term wavelet A in FIG. 9 has a complex factorization. Prior art Wiener (or least squares) techniques are used to obtain the inverse B of wavelet A. The EGD inverse shown at C and derived in accordance with the invention by using the sequence of 2-term operators (which are only real values) gives the inverse C.

Figure 10:
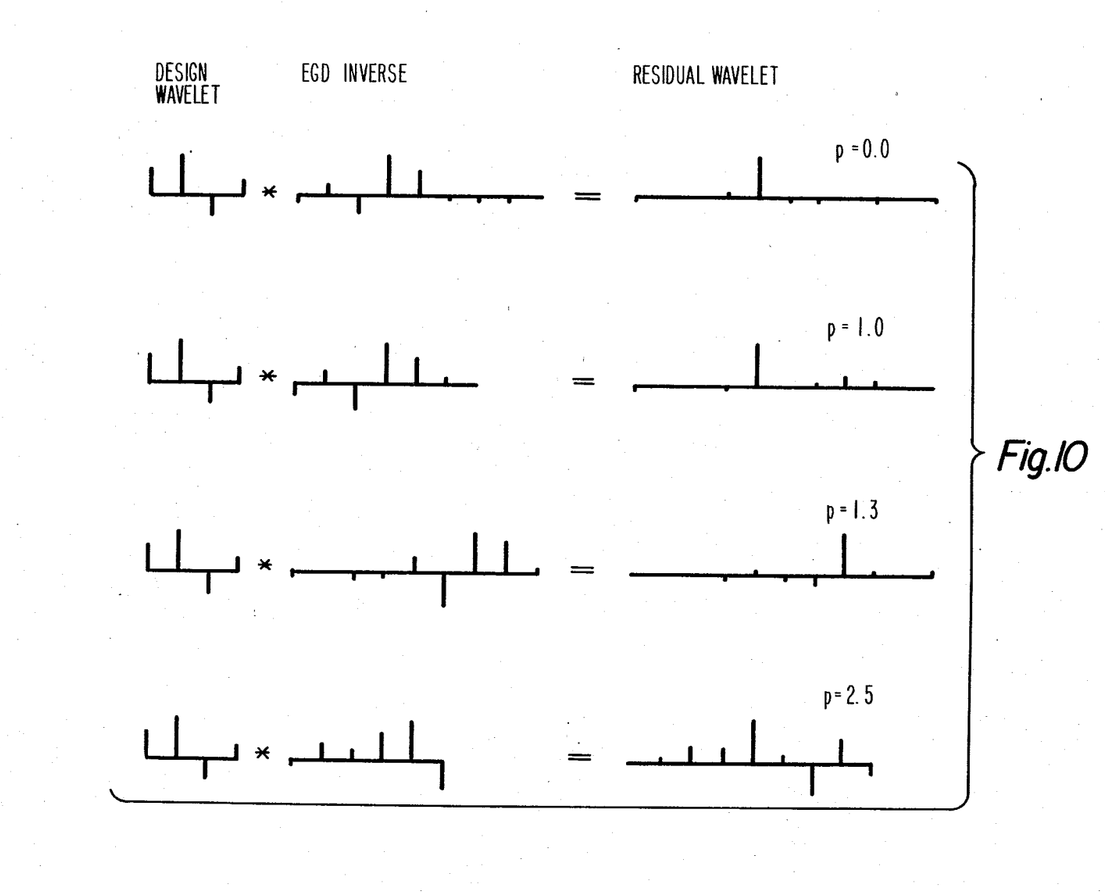
FIG. 10 illustrates the usefulness of the invention with observed signals within a certain Gaussian parameter.

FIG. 10 illustrates the effectiveness of the invented technique with observed signals having certain Gaussian characteristics. The residual wavelet in each case is the result of convolving the design wavelet with a 100-point random series, and then finding and applying a sequence of 2-term operators in accordance with the invention. The p-values given in FIG. 10 identify the Generalized Gaussian parameter of the observed signal (the result of convolving the design wavelet with the 100-point random series). As seen, the invention gives stable deconvolution at least where the observed signal has a p-value less than about 1.5.

The exemplary process described above in connection with FIG. 6 can be carried out by storage and processing system 36 illustrated schematically in FIG. 1, which can comprise a general purpose digital computer of suitable size and configuration, using the appropriate peripheral equipment needed to carry out the function described above. One example of a suitable digital computer is available from Digital Equipment Corporation under the designation VAX, and can carry out the process described above when programmed, e.g. by defining the steps of FIG. 10 in a suitable high level language such as Fortran and using available subroutines. In the alternative, some or all of the steps discussed above in connection with FIG. 10 can be implemented by hardwired and/or firmwired circuitry.

It should be noted that for drafting convenience the operators at lines (c1) and (c2) in FIGS. 3–5 are illustrated as having some width along the time (horizontal) axis, while in fact they simply represent amplitudes with no width. In FIGS. 8–10 a different representation is used, to show amplitude (aling the vertical axis) with no suggestion of width. It should also be noted that in a special case it may be that the lag (such as illustrated at d in FIGS. 2–5) could happen to be so small that the terms of the two-term operator will not be separated by zeroes. In such a case, the operator may have the form [1,a] or [a,1], and it will be understood that such an operator is merely a special case of the operators [1,0, ...,a] or [a,0, ...,1], and that such a special case is within the scope of this invention.

Figure 7:
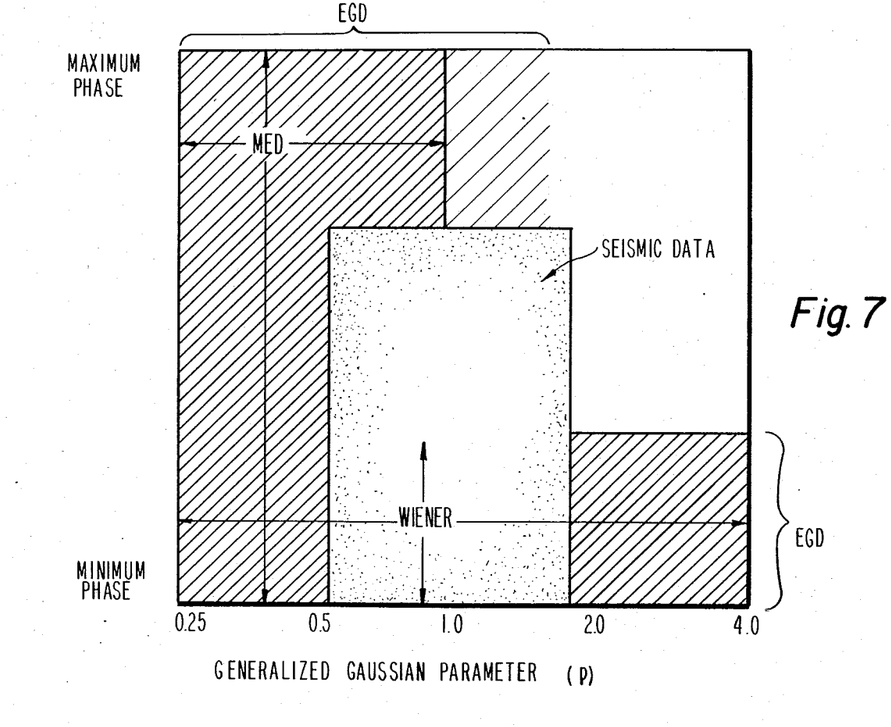
FIG. 7 illustrates the nature of possible types of observed signals.

A conceptual illustration is given in FIG. 7 of the effectiveness of the invented system and process as applied to seismic signals. As indicated, if seismic data tend to occupy the so-labelled rectangle on the plot, the prior art minimum entropy and Wiener deconvolution techniques apply to a considerably lesser range of the data than the invented entropy-guided deconvolution.

I claim:

1. A seismic exploration method comprising:
   deriving an observed seismic signal related to the interaction of a seismic source wavelet with subsurface formations;
   cumulatively modifying the observed signal by a sequence of operators selected both on the basis of a least squares technique and on the basis of their effectiveness in reducing entropy; and
   using the cumulatively modified observed signal as an estimate of seismic properties of said subsurface formations.

2. A method as in claim 1 in which the observed seismic signal is derived from the output of one or more geophones in reflection seismic exploration.

3. A method as in claim 1 in which the observed seismic signal is derived from the output of one or more receivers in vertical seismic profiling.

4. A method as in claim 1 in which the observed seismic signal is not minimum phase or highly non-Gaussian.

5. A method as in claim 1 in which the observed seismic signal is mixed phase.

6. A method as in claim 1 in which each operator has two non-zero terms separated by zero terms.

7. A method as in claim 6 in which operator is of the form [1,0,0, ...,a] or [a,0,0, ...,1].

8. A method as in claim 7 in which the term a of the two-term operator is derived as a function of the auto-correlation of the observed signal as modified by the application of any preceding operators.

9. A method as in claim 8 in which the separation between the non-zero terms of an operator is derived on the basis of the distance between the center and a selected side lobe of the auto-correlation of the observed signal as modified by the application of any preceding operators.

10. A method as in claim 9 in which the form [1,0,0, ...,a] or [a,0,0, ...,1] of each operator is chosen on the basis of which form gives greater reduction in entropy when applied to the observed signal as cumulatively modified by the application of any previous operators.

11. A method as in claim 10 in which the reduction in entropy is measured by a Varimax measure.

12. A method as in claim 11 where the Varimax measure is of the form $V = [y(i)]^4/[y(i)^2]^2$, where y(i) is the current cumulatively modified observed signal.

13. A method as in claim 12 in which each operator is of the form [1,0,0, ...,a] or [a,0,0, ...,1].

14. A method as in claim 13 in which the form chosen for a particular operator is that which gives greater reduction in entropy when applied to the observed signal as cumulatively modified by any preceding operators.

15. A method as in claim 14 in which the entropy reduction is measured by a Varimax measure.

16. A method as in claim 15 in which the Varimax measure is of the form $V = [y(i)]^4/[y(i)^2]^2$, where y(i) is the current cumulatively modified observed signal.

17. A geophysical exploration method comprising:
    deriving an observed signal which need not be minimum phase or highly non-Gaussian and is related to the interaction of a source wave with subsurface formations;

modifying the observed signal by a sequence of operators each of which is selected on the basis of both a least squares technique and the degree of entropy reduction achieved by applying it to the observed signal as cumulatively modified by the application of any preceding operators; and using the cumulatively modified observed signal as an estimate of a non-time varying sequence of attributes of said subsurface formations.

18. A method as in claim 17 in which the observed signal is a seismic signal.

19. A method as in claim 18 in which the observed signal is a reflection seismic exploration signal.

20. A method as in claim 18 in which the observed signal is a vertical seismic profiling signal.

21. A method as in claim 17 in which said modifying is discontinued when the application of a new operator fails to decrease entropy by more than a selected amount.

22. A method as in claim 1 in which the selection of operators on the basis of a least squares technique includes applying a least squares technique to the observed signal as modified by the application of any preceding operators.

23. A method as in claim 22 in which the least squares technique comprises using an auto-correlation function of the observed signal, as modified by the application of any preceding operators, to generate at least two possible operators.

24. A method as in claim 23 in which the selection of operators on the basis of effectiveness in reducing entropy comprises testing the at least two possible operators for effectiveness in reducing entropy to select one of them as the next operator in said sequence of operators.

25. A method as in claim 1 in which the modifying step comprises applying a least squares technique to the observed signal, as modified by the application of any preceding operators, to derive at least two possible operators, testing the possible operators for their effectiveness in reducing entropy to select one of them, and using the selected operator as the next operator in said sequence of operators.

26. A method as in claim 1 in which the modifying step comprises deriving and using an auto-correlation of the observed signal, as modified by the application of any preceding operators, to derive two possible operators each of which has two non-zero terms separated by zero terms, where both the separation and the magnitude of the non-zero terms are functions of said auto-correlation, and where the non-zero terms of the two possible operators are of the same magnitude but reversed in order, and selecting from among the two possible operators the one which is more effective in reducing entropy on the basis of a Verimax measure.

27. A method comprising the steps of:
deriving an observed signal related to the interaction of a source wavelet with physical formations;
cumulatively modifying the observed signal by operators each of which is selected from among a number of possible operators derived on the basis of a least squares technique, the selection being on the basis of the effectiveness of the possible operators in reducing entropy; and
using the cumulatively modified signal as an estimate of selected properties of the physical formations.

28. A method as in claim 27 in which the derivation of possible operators comprises applying a least squares technique to the observed signal as modified by the application of any preceding operators.

29. A method as in claim 27 in which said applying of a least squares techniques comprises deriving and using an auto-correlation of the observed signal, as modified by the application of any preceding operators, to generate at least two possible operators.

30. A method as in claim 27 in which the modifying step comprises applying a least squares technique to the observed signal, as modified by the application of any preceding operators, to derive at least two possible operators, and testing the possible operators for their effectiveness in reducing entropy to select one of them for use as the next operator in said sequence of operators.

31. A method as in claim 27 in which the modifying step comprises deriving and using an auto-correlation of the observed signal, as modified by the application of any preceding operators, to derive two possible operators each of which has two non-zero terms separated by zero terms, where both the separation and the magnitude of the non-zero terms are functions of said auto-correlation, and where the non-zero terms of the two possible operators are of the same magnitude but reversed in order, and selecting from among the two possible operators the one which is more effective in reducing entropy on the basis of a Verimax measure.

32. A method as in claim 27 in which the observed signal is a seismic signal.

33. A method comprising:
(a) deriving an observed signal related to the interaction of a source wavelet with a physical formation;
(b) applying a least squares technique to the observed signal to derive two possible operators which are mirror images of each other;
(c) using a Verimax measure to select, from among the possible operators, the one which is likely to be more effective than the other in reducing entropy when applied to the observed signal;
(d) applying the selected operator to the observed signal to produce a modified observed signal;
(e) repeating steps (b)–(d), where the modified observed signal produced in any given pass through step (d) becomes the observed signal used in the next pass through step (b), to thereby produce a cumulatively modified observed signal, until the modified signal produced from a new pass through step (d) differs by less than a selected threshhold from that produced from the previous pass through step (d); and
(f) using the modified observed signal as a measure of a selected property of the physical formation.

34. A method as in claim 33 in which the observed signal is a seismic signal.

35. A method as in claim 33 in which the observed signal is a VSP signal.

* * * * *